US011216313B2

(12) United States Patent
Jiang

(10) Patent No.: US 11,216,313 B2
(45) Date of Patent: Jan. 4, 2022

(54) METHOD AND APPARATUS FOR PROCESSING RESOURCE REQUEST

(71) Applicant: TENCENT TECHNOLOGY (SHENZHEN) COMPANY LIMITED, Shenzhen (CN)

(72) Inventor: Haitao Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 144 days.

(21) Appl. No.: 16/442,971

(22) Filed: Jun. 17, 2019

(65) Prior Publication Data
US 2019/0303201 A1 Oct. 3, 2019

Related U.S. Application Data

(63) Continuation of application No. PCT/CN2018/082844, filed on Apr. 12, 2018.

(30) Foreign Application Priority Data

Apr. 18, 2017 (CN) .......................... 201710253253.3

(51) Int. Cl.
G06F 9/46 (2006.01)
G06F 9/50 (2006.01)
A63F 13/358 (2014.01)

(52) U.S. Cl.
CPC ............ *G06F 9/505* (2013.01); *A63F 13/358* (2014.09); *G06F 2209/504* (2013.01); *G06F 2209/5013* (2013.01); *G06F 2209/5022* (2013.01)

(58) Field of Classification Search
CPC ............. G06F 9/505; G06F 2209/5013; G06F 2209/5022; G06F 2209/504; G06F 9/5077; A63F 13/358; A63F 13/35; A63F 13/822
See application file for complete search history.

(56) References Cited

U.S. PATENT DOCUMENTS

2002/0049690 A1* 4/2002 Takano .................. G06N 3/006
706/47
2007/0032297 A1 2/2007 Hara
(Continued)

FOREIGN PATENT DOCUMENTS

CN 1908949 A 2/2007
CN 101126991 A 2/2008
(Continued)

OTHER PUBLICATIONS

The State Intellectual Property Office of the People's Republic of China (SIPO) Office Action 1 for 201710253253.3 dated Mar. 29, 2018 7 Pages (including translation).
(Continued)

Primary Examiner — Adam Lee
(74) Attorney, Agent, or Firm — Anova Law Group, PLLC

(57) ABSTRACT

A method and an apparatus for processing a resource request are provided. The method includes: classifying, by a computing device, access virtual objects into a plurality of density grades according to a density of interaction virtual objects in a current interactive range of each access virtual object; allocating a resource request quota to each density grade. The method also includes: when a resource request sent by an access virtual object in a first density grade is received within the first preset duration, processing the resource request if the resource request quota corresponding to the density grade is greater than the preset quota thresh-
(Continued)

old, and subtracting a preset value from the resource request quota corresponding to the density grade; and rejecting the resource request if the resource request quota corresponding to the density grade is not greater than the preset quota threshold.

13 Claims, 7 Drawing Sheets

(56) References Cited

U.S. PATENT DOCUMENTS

| | | |
|---|---|---|
| 2007/0294387 A1 | 12/2007 | Martin |
| 2010/0075761 A1* | 3/2010 | Lord ................... G06Q 30/02 463/43 |
| 2010/0299618 A1 | 11/2010 | Pare |
| 2011/0055726 A1 | 3/2011 | Hamilton et al. |
| 2012/0026177 A1 | 2/2012 | Johlic et al. |
| 2012/0329556 A1* | 12/2012 | Eddy ................... A63F 13/822 463/30 |
| 2014/0176552 A1 | 6/2014 | Belmans et al. |
| 2014/0344457 A1 | 11/2014 | Bruno, Jr. et al. |

FOREIGN PATENT DOCUMENTS

| | | |
|---|---|---|
| CN | 103218265 A | 7/2013 |
| CN | 103873457 A | 6/2014 |
| CN | 103971416 A | 8/2014 |
| CN | 105391758 A | 3/2016 |
| CN | 105473196 A | 4/2016 |
| CN | 106991013 A | 7/2017 |

OTHER PUBLICATIONS

The World Intellectual Property Organization (WIPO) International Search Report for PCT/CN2018/082844 dated Jul. 13, 2018 6 Pages (including translation).

* cited by examiner

METHOD AND APPARATUS FOR PROCESSING RESOURCE REQUEST

CROSS-REFERENCES TO RELATED APPLICATIONS

This application is a continuation application of PCT Patent Application No. PCT/CN2018/082844, filed on Apr. 12, 2018, which claims priority to China Patent Application No. 201710253253.3, filed with the Chinese Patent Office on Apr. 18, 2017 and entitled "METHOD AND APPARATUS FOR PROCESSING RESOURCE REQUEST", the entire contents of both of which are incorporated herein by reference.

FIELD OF TECHNOLOGY

Embodiments of this application relates to the field of games, and in particular, to a method and an apparatus for processing a resource request.

BACKGROUND OF THE DISCLOSURE

A Massive Multiplayer Online Role-Playing Game (MMORPG) refers to a game in which a player plays a role in a virtual world running in a server and can create a user group to participate in large-scale user group interactive activities.

A next generation strong-interaction action online game is an MMORPG based on a powerful computing processing capability and network transmission capability of a modern computing system, and can provide players with high-quality combat performance, fast-paced combat experience, complex combat details, and a high-frequency interaction function between players during a combat. Computing system performance overheads and a network traffic pressure caused by casting of a single combat spell in such a game are multiple orders of magnitude higher than in a typical conventional MMORPG.

Expression details of spells, the fast pace of combats, and the smoothness of strong interactions of the next generation strong-interaction action online game are the core experience and one of competitive advantages of the game. However, the addition of the spell expression details, the acceleration of the combat pace, and the production of the strong interactions bring about a significant increase in computing overheads of a server, therefore aggravating a stalling problem caused by an insufficient computing capability of the server in large-scale same-screen match.

SUMMARY

Embodiments of this application provide a method and an apparatus for processing a resource request, so as to alleviate a stalling problem caused by an insufficient computing capability of a server.

According to a first aspect, the embodiments of this application provide a method for processing a resource request. The method includes: classifying, by a computing device, access virtual objects into a plurality of density grades according to a density of interaction virtual objects in a current interactive range of each access virtual object; and allocating a resource request quota to each density grade. The level of the density grade is positively correlated to a value of the density of interaction virtual objects. The resource request quota corresponds to each density grade is a quantity of resource requests that are sent by access virtual objects in the density grade and that are allowed to be processed within a first preset duration. The method also includes: when a resource request sent by an access virtual object in a first density grade is received within the first preset duration, processing the resource request if the resource request quota corresponding to the density grade is greater than the preset quota threshold, and subtracting a preset value from the resource request quota corresponding to the density grade; and rejecting the resource request if the resource request quota corresponding to the density grade is not greater than the preset quota threshold.

According to a second aspect, the embodiments of this application provide an apparatus for processing a resource request; the apparatus includes one or more processors and one or more memories for storing program units, where the program units are executed by the processor, and the program units include: a density grade division unit, configured to classify access virtual objects into a plurality of density grades according to a density of interaction virtual objects in a current interactive range of each access virtual object; and a quota allocation unit, configured to allocate a resource request quota to each density grade. The level of the density grade is positively correlated to a value of the density of interaction virtual objects. The resource request quota corresponds to each density grade is a quantity of resource requests that are sent by access virtual objects in the density grade and that are allowed to be processed within a first preset duration. The program units also include a resource request receiving unit, configured to receive a resource request sent by an access in a first density grade; and a resource request processing unit, configured to: when the receiving unit receives, within the first preset duration, the resource request sent by a virtual object in the first density grade, process, if it is determined that a resource request quota corresponding to the first density grade is greater than a preset quota threshold, a resource request, and subtract a preset value from the resource request quota corresponding to the first density grade; and reject the resource request if it is determined that the resource request quota corresponding to the first density grade is less than or equal to the preset quota threshold.

According to a third aspect, the embodiments of this application provide a non-transitory computer-readable storage medium storing computer program instructions executable by at least one processor. The computer program instructions cause the at least one processor to perform: classifying access virtual objects into a plurality of density grades according to a density of interaction virtual objects in a current interactive range of each access virtual object; and allocating a resource request quota to each density grade. The level of the density grade is positively correlated to a value of the density of interaction virtual objects. The resource request quota corresponds to each density grade is a quantity of resource requests that are sent by access virtual objects in the density grade and that are allowed to be processed within a first preset duration. The computer program instructions also cause the at least one processor to perform: when a resource request sent by an access virtual object in a first density grade is received within the first preset duration, processing the resource request if the resource request quota corresponding to the density grade is greater than the preset quota threshold, and subtracting a preset value from the resource request quota corresponding to the density grade; and rejecting the resource request if the resource request quota corresponding to the density grade is not greater than the preset quota threshold.

According to a fourth aspect, the embodiments of this application provide an electronic apparatus, including a memory and a processor, where a computer program is stored in the memory, and the processor is configured to perform the method in the embodiments of this application through the computer program.

It can be learned from the foregoing technical solutions that the embodiments of this application have the following advantages:

In the embodiments of this application, access virtual objects are classified into a plurality of density grades according to a density of interaction virtual objects in a current visual range of each virtual object; a resource request quota is allocated to each density grade; when a resource request sent by a virtual object in a density grade is received within preset duration, the received resource request is processed if it is determined that a resource request quota corresponding to the density grade is greater than a preset quota threshold, and a preset value is subtracted from the resource request quota corresponding to the density grade; and the resource request is rejected if it is determined that the resource request quota corresponding to the density grade is less than or equal to the preset quota threshold. In the embodiments of this application, virtual objects can be classified into density grades, and a resource request quota is allocated to each density grade; when the resource request quota is less than or equal to a preset quota threshold, a central processing unit (CPU) rejects processing resource requests sent by virtual objects in the density grade, so that processing of the CPU is not overloaded, thereby alleviating a stalling problem caused by an insufficient computing capability of a server.

DESCRIPTION OF EMBODIMENTS

Embodiments of this application are described in further detail below with reference to the accompanying drawings.

Figure 1:
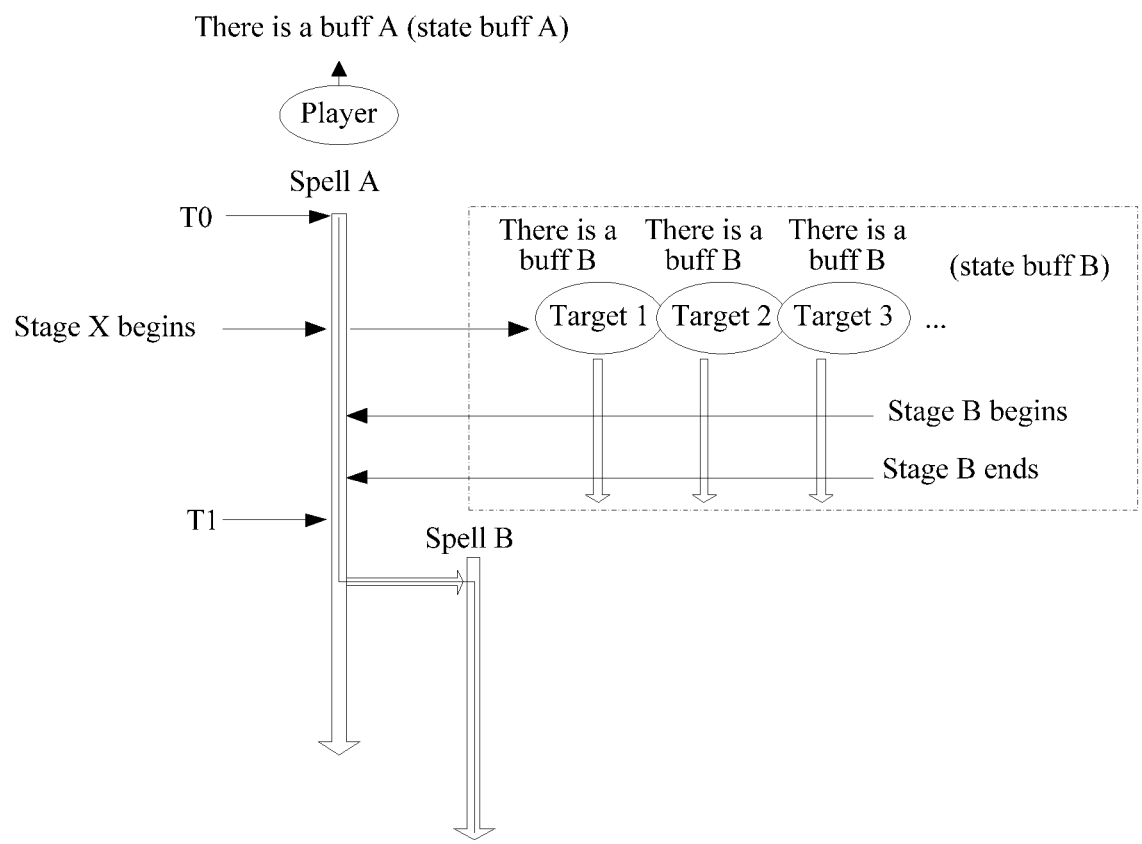
FIG. 1 shows an example of logic features of spell casting in a typical next generation strong-interaction action online game according to an embodiment of this application.

Spell casting logic of a typical next generation strong-interaction action online game is shown in FIG. 1. A player casts a spell A at a time point T0. The spell has 15 stages including a stage 1 to a stage 15, and hits 60 targets including a target t1 to a target 60. There is a buff A. The buff is interactive data with time-effectiveness on an active entity. The buff changes as time in a virtual world goes by, and interacts logically with virtual world objects other than the active entity. When there is a buff A on a spell caster, the buff causes an effect A on the spell caster. The effect A has the following logic: there is such a buff B that, on a target hit by a stage X of the spell A, if execution of corresponding logic of a stage B of the buff B is completed before a time point T1, logic of stages of the spell A after the stage X is replaced with the logic of the spell B.

It can be seen from FIG. 1 that, for an MMORPG server, players in different game scenes have different behaviors, and executed logic processes also have obvious changes. This causes the MMORPG server to have a performance hotspot drifting characteristic. The so-called performance hotspot drifting refers to a phenomenon that a performance hotspot of the same software module changes in different time and different execution scenes. As a result, it is difficult to find a system hotspot to carry out an algorithm optimization policy.

In addition, a computing task of spell casting of a single player is a state machine that is strongly correlated to a timeline and that has a plurality of stages. Computing of each stage needs to depend on a computing result of a previous stage. Therefore, it is difficult to decompose computing dependency. Because there is strong data dependency between players, it is difficult to decompose the data dependency. Therefore, it is difficult to perform parallel processing.

In the embodiments of this application, actual requirements and behavior features during a same-screen match among a plurality of MMORPG players are taken into consideration in combination with cluster density distributions of the players, so that within the boundary of actual physical performance of an existing server, a spell casting delay during a multi-player same-screen match can be smoothed based on computing power distribution characteristics of the server, thereby improving overall spell throughput of the players, and avoiding a computing power avalanche effect of the server.

The avalanche effect herein means that, when load of a server reaches a physical limit, processing of a failure event inside the server produces extra processing pressure, and at the same time, a client starts to execute a policy of post-failure re-requesting and therefore generates an extra processing request, resulting in a dramatic decline in an actual processing capability of the server. Consequently, a stalling problem is caused.

Performance of a physical server is always limited in a given period of time. However, players have unlimited demands on the quantity of players in the same-screen match and improvement in combat quality. Besides, due to features of a computing model of an MMORPG multi-player same-screen match application scenario, it is difficult to improve the overall processing capability linearly by expanding the quantity of computing elements. Therefore, in fact, the server cannot ensure lossless completion of computing processing operations for all combat requests in real time.

However, a product requirement of the MMORPG multi-player same-screen match is to enable players to experience as high combat quality as possible, rather than enabling the server to actually process as many combat effects as possible successfully. Due to the presence of psychological features such as a biological response time of a player and selective neglect of information in a particularly complex scenario by a human body, it is possible to significantly reduce the computing load of the server while ensuring the actual experience of players.

Figure 2:
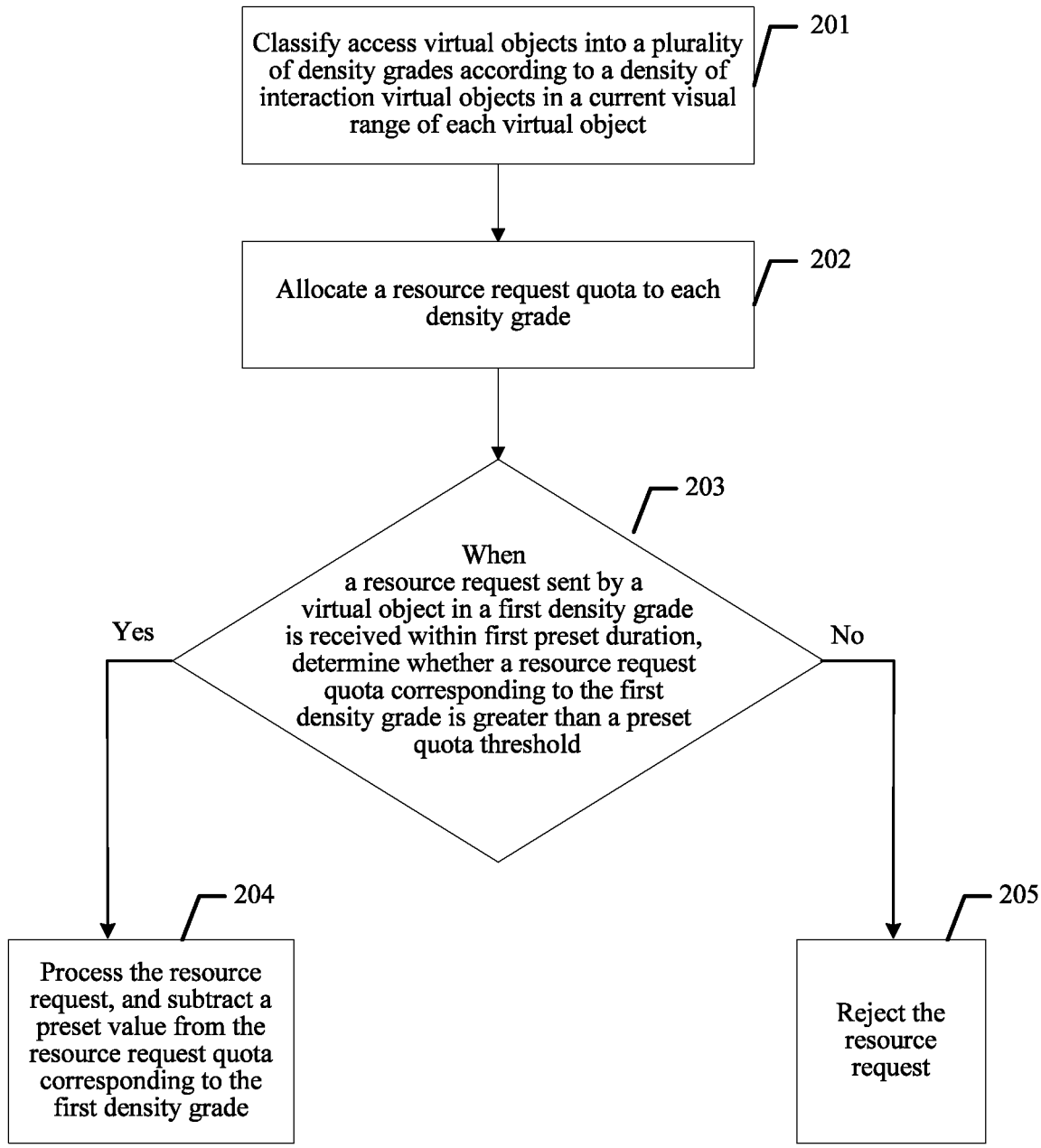
FIG. 2 is a flowchart of a method for processing a resource request according to an embodiment of this application.

FIG. 2 is a flowchart of a method for processing a resource request according to an embodiment of this application.

During a game, each player has a corresponding visual range. The visual range can be interpreted as a current screen of the player, that is, an area where the player is located on an entire map provided by a game application program.

Figure 3:
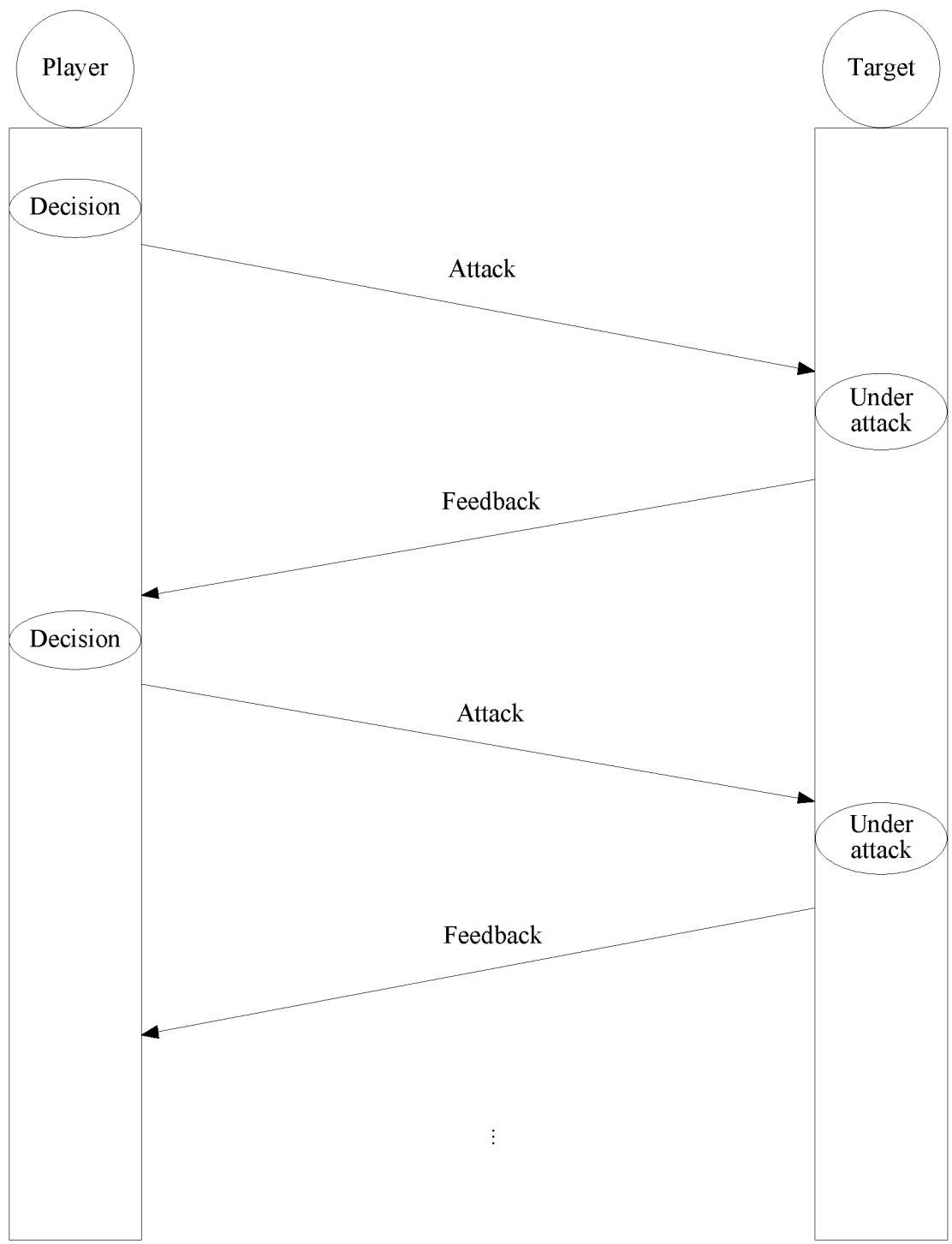
FIG. 3 is a schematic diagram of a typical behavior mode of a player in a medium-to-low density area according to an embodiment of this application.

When there are few players in the visual range, the player is in a low-density area. In this case, the player fights against a single or few rivals. A typical behavior mode of the player is shown in FIG. 3. The player obtains a corresponding feedback for each attack launched. In this behavior mode of the player, the player is extremely sensitive to real-time combat feedbacks and the timeline, and uplink requests are at a relatively low frequency and strategic. The player is extremely sensitive each time an attack decision is made, until the attack hits a target object and the target object is under attack. The player pays close attention to the feedback corresponding to each attack.

Figure 4:
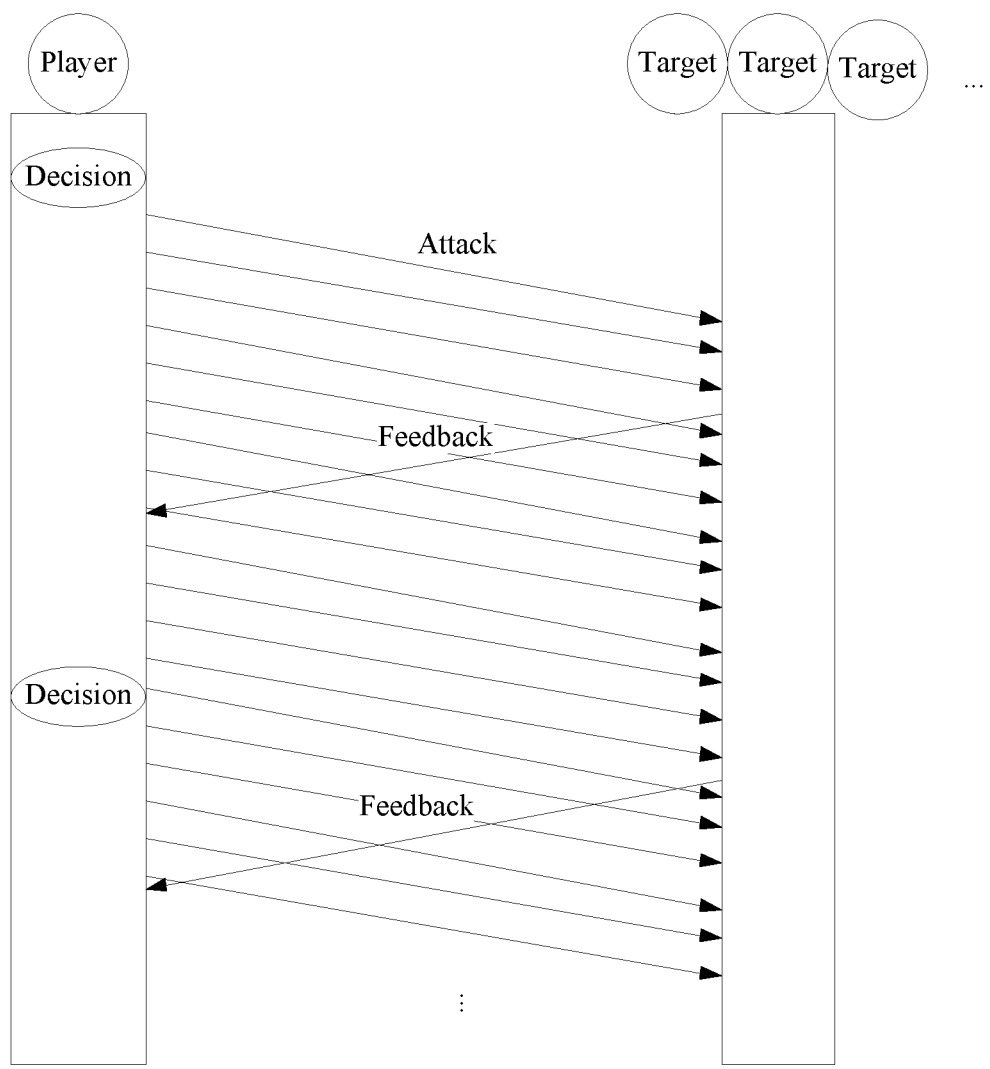
FIG. 4 is a schematic diagram of a typical behavior mode of a player in a high density area according to an embodiment of this application.

When there are hundreds of players in the visual range (enemies in the screen), the player is in a high density area, and the behavior mode as well as the focus of the player changes greatly. The behavior mode of the player becomes what is shown in FIG. 4. Attacks launched by the player are more than feedbacks received.

Because a human body cannot process massive information within a short period of time, the player in the high density area is actually insensitive to precisely logical real-time combat feedbacks and the timeline. Moreover, because the player sends repeated requests at a high frequency, the player cannot determine whether a single request is responded to in time. Therefore, the player does not pay attention to the feedback for each attack.

In addition, from the perspective of processing computing of the server, computing load that needs to be processed for a single spell increases as the quantity of targets under attack grows. Therefore, a spell cast by a player in a dense crowd has much higher performance overheads than the same spell cast by a player in a sparse crowd.

Based on the features of the player in the low density area and the player in the high density area, the following processing is performed in some embodiments of this application:

201. Classify access virtual objects into a plurality of density grades according to a density of interaction virtual objects in a current visual range of each virtual object.

A virtual object, or an access virtual object, in some embodiments of this application refers to an object virtualized in a game application program, and is an active entity in a game virtual world. Each access virtual object may correspond to a registered user in the game application program, that is, correspond to a player.

A specific process of classifying access virtual objects into a plurality of density grades may be as follows:

A density of interaction virtual objects in a current interactive range of each virtual object is obtained, and access virtual objects, whose densities belong to the same numerical range, are classified into the same density grade. An interaction virtual object, as used herein, may refer to an active entity (e.g., a user/player) or a non-active entity (e.g., a non-player character not controlled by a player but having predetermined or responsive behavior, an object in a surrounding environment of the access object such as trees and buildings, etc.) in the virtual world. In the present disclosure, the term "virtual object" generally refers to an access virtual object (e.g., controlled by a user) except when the term "interaction virtual object" is specifically identified.

That is, for each virtual object (i.e., access virtual object), a location of the virtual object on a map provided by the game application program is obtained, and an interactive range of the virtual object is obtained according to the location. The interactive range may also be referred as a visual range of the virtual object and indicates an area that the player can see on a current screen (e.g., a portion of the virtual world presented to a player by a game client). A total quantity of interaction virtual objects in the area is calculated. The interaction virtual objects herein are other virtual objects in the visual range of the virtual object except the virtual object. That is, the quantity of enemies in the current screen of the player corresponding to the virtual object is calculated. Specifically, the virtual object may generate a broadcasting event (e.g., casting a spell that has an Area of effect or AoE) to obtain the quantity of interaction virtual objects nearby.

Then, virtual objects with total quantities belonging to the same numerical range are classified into the same density grade. The numerical range may be a preset numerical range, or the numerical range may be set in real time according to a total quantity of current online virtual objects.

For example, if three numerical ranges are preset, which are [1-20], [21-100] and [101-∞] respectively, and density grades corresponding to the numerical ranges are a grade 1 (low density grade), a grade 2 (medium density grade), and a grade 3 (high density grade) respectively, levels of the density grades are positively correlated (e.g., directly proportional) to values of densities of the virtual objects.

For example, the total quantity of interaction virtual objects in the current visual range of the virtual object 1 is 10, the total quantity of interaction virtual objects in the current visual range of the virtual object 2 is 5, the total quantity of interaction virtual objects in the current visual range of the virtual object 3 is 200, the total quantity of interaction virtual objects in the current visual range of the virtual object 4 is 30, and the total quantity of interaction virtual objects in the current visual range of the virtual object 5 is 60. In this case, the virtual object 1 and the virtual object 2 belong to the numerical range [1-20] and are classified into the density grade 1; the virtual object 4 and the virtual object 5 belong to the numerical range [21-100] and are classified into the density grade 2; the virtual object 3 belongs to the numerical range [101-∞] and is classified into the density grade 3.

Online virtual objects in the game application program are classified into M density grades, and a virtual object in a density grade m is recorded as ACTORm. For example, virtual objects in the density grade 1, the density grade 2, the density grade 3, and the density grade 4 are recorded as ACTORm1, ACTORm2, ACTORm3, and ACTORm4 respectively.

The density grade into which each virtual object is classified changes in real time with a density degree of interaction virtual objects in the area where the virtual object is located.

202. Allocate a resource request quota to each density grade.

A resource request in some embodiments of this application may be a game spell request sent by a virtual object to a server during the game. The virtual object sends the game spell request to the server, so as to release a game spell. The game spell refers to a behavior mode of the virtual object in the virtual world of the online game. The virtual object may cast a spell to generate a series of effects on itself and a target.

In addition, the resource request in some embodiments of this application may also be another request such as a game buff request sent by the virtual object to the server during the game, for example, using virtual props (e.g., that have effect on other interaction virtual objects and/or the access virtual object itself) or obtaining a buff displayed on the map (e.g., game screen).

After the online virtual objects are classified into M density grades in the game application program, an initial resource request quota is allocated to each density grade. The initial resource request quota corresponding to each density grade is a quantity of resource requests that are sent by virtual objects in the density grade and that are allowed to be processed within first preset duration t. That is, the virtual objects in the density grade share one resource request quota within the first preset duration t.

Figure 5:
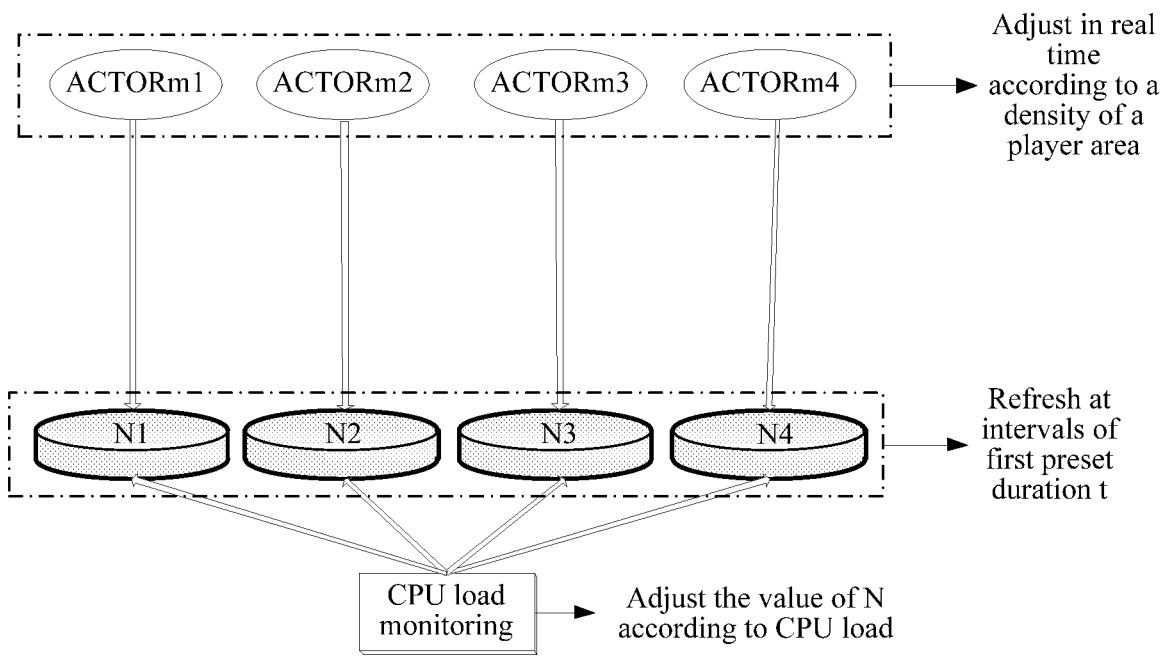
FIG. 5 is a schematic diagram of allocation of a resource request quota according to an embodiment of this application.

As shown in FIG. 5, initial resource request quotas allocated to the density grades ACTORm1, ACTORm2, ACTORm3, and ACTORm4 are N1, N2, N3, and N4 respectively. If N1=500, it indicates that the quantity of resource requests allowed to be processed by the server or to allowed to be sent by virtual objects in ACTORm1 to the server (e.g., within certain time duration) is 500.

It should be noted that, the same initial resource request quota may be allocated to each density grade. For example, values of N1, N2, N3, and N4 may be the same. In some other embodiments, the initial resource request quota allocated to each density grade may be related to the level of the density grade (e.g., negatively correlated with the density grade). For example, values of N1, N2, N3, and N4 may be 500, 400, 300, 200. In some cases, the server may respond to each resource request sent by users that have less interaction virtual objects (e.g., scenario illustrated in FIG. 3), and may respond to every other resource request sent by users that have more interaction virtual objects (e.g., scenario illustrated in FIG. 4).

Optionally, when allocated to each density grade, the initial resource request quota is specifically allocated according to current load of a CPU of the server (that is, usage of the CPU). The value of the resource request quota is negatively correlated (e.g., inversely proportional) to the current load of the CPU. As the load of the CPU increases, the resource request quota decreases gradually. When the current load of the CPU is high, a low resource request quota is allocated to each density grade; when the current load of the CPU is low, a high resource request quota is allocated to each density grade.

Therefore, as the load of the CPU increases, the overall performance overheads are decreased more significantly. When the load of the CPU is extremely high and exceeds a preset overload threshold, for example, when the usage of the CPU exceeds 90%, the resource request quota is decreased significantly, so as to prevent continuous deterioration of subsequent experience caused by an avalanche.

With reference to FIG. 5, for example, it is assumed that the resource request quotas N1, N2, N3, and N4 initially allocated each time have the same value. When the usage of the CPU is 0% to 30%, N1, N2, N3, and N4 are each configured to be 500; when the usage of the CPU is 31% to 60%, N1, N2, N3, and N4 are each configured to be 400; when the usage of the CPU is 61% to 90%, N1, N2, N3, and N4 are each configured to be 300; and when the usage of the CPU is 91% to 100%, N1, N2, N3, and N4 are each configured to be 100.

When the server processes a resource request sent by a virtual character in a density grade, a preset value is correspondingly subtracted from the resource request quota corresponding to the density grade.

Optionally, the preset value is 1.

203. When a resource request sent by a virtual object in a first density grade is received within first preset duration, determine whether a resource request quota corresponding to the first density grade is greater than a preset quota threshold.

The first density grade in some embodiments of this application is one of a plurality of the density grades obtained through classification.

When a resource request sent by a virtual character in the first density grade is received, it is first determined whether the resource request quota corresponding to the first density grade is greater than a preset quota threshold, where the preset quota threshold may be 0.

If the resource request quota corresponding to the first density grade is greater than the preset quota threshold, step 204 is performed; if the resource request quota corresponding to the first density grade is less than the preset quota threshold, step 205 is performed.

204. If the resource request quota corresponding to the first density grade is greater than the preset quota threshold, process the resource request, and subtract a preset value from the resource request quota corresponding to the first density grade.

If the resource request quota corresponding to the first density grade is greater than the preset quota threshold, the received resource request sent by the virtual character in the first density grade is processed, and a preset value, such as 1, is subtracted from the resource request quota corresponding to the density grade.

205. If the resource request quota corresponding to the first density grade is less than or equal to the preset quota threshold, reject the resource request.

Each time a resource request sent by a virtual character in the first density grade is processed, a preset value is subtracted from the resource request quota corresponding to the first density grade, until the resource request quota corresponding to the first density grade is less than or equal to the preset quota threshold, which indicates that the resource request quota corresponding to the density grade is used up or reaches a minimum value, and no more resource requests can be processed. In this case, a resource request sent by a virtual character in the first density grade is rejected.

Optionally, within the first preset duration in step 203, when a resource request sent by a virtual object in the first density grade is received, the following operation may be performed directly:

if it is determined that the resource request quota corresponding to the first density grade is greater than the preset quota threshold, processing the resource request, and subtracting a preset value from the resource request quota corresponding to the first density grade; and if it is determined that the resource request quota corresponding to the first density grade is less than or equal to the preset quota threshold, rejecting the resource request.

In some embodiments of this application, virtual objects can be classified into density grades, and a resource request quota is allocated to each density grade; when the resource request quota is less than or equal to a preset quota threshold, a CPU rejects processing a resource request sent by a virtual object in the density grade, so that processing of the CPU is not overloaded, thereby alleviating a stalling problem caused by an insufficient computing capability of a server.

Further, players in a low density area (that is a low density grade) have a higher requirement on spell precision and are also more sensitive to experience. Moreover, because a spell cast by a player in the low density area hits fewer targets, the spell causes lower overheads. Therefore, in some embodiments of this application, resource requests are preferentially allocated to players in the low density area, so that resource requests of players highly sensitive to experience are prioritized in the case of limited physical resources.

Therefore, when the resource request quota of virtual characters in the first density grade is less than the preset quota threshold, a resource request quota of a density grade higher than the first density grade may be used.

In this case, when a resource request sent by a virtual object in the first density grade is received within the first preset duration t, it is first determined whether the resource request quota corresponding to the first density grade is greater than the preset quota threshold; if the resource request quota corresponding to the first density grade is not greater than the preset quota threshold, that is, if the resource request quota corresponding to the first density grade is less than or equal to the preset quota threshold, it is further determined whether resource request quotas corresponding to other density grades higher than the first density grade are all less than the preset quota threshold; and the received resource request is rejected only when the resource request quotas are all less than the preset quota threshold.

If a density grade (a second density grade) higher than the first density grade still has an available resource request quota, that is, the resource request quota corresponding to the second density grade is greater than the preset quota threshold, the resource request is processed by using the resource request quota of the second density grade, and a preset value is subtracted from the resource request quota corresponding to the second density grade.

Optionally, when a resource request sent by a virtual object in the first density grade is received, if it is determined that the resource request quota corresponding to the first density grade is less than or equal to the preset quota threshold and it is determined that resource request quotas corresponding to other density grades higher than the first density grade are all less than the preset quota threshold, the resource request is rejected.

Optionally, when a resource request quota of another density grade higher than the current density grade is used, a resource request quota of a density grade that is one grade higher than the current density grade is first obtained. If there is an available resource request quota (that is, the resource request quota corresponding to the density grade is greater than the preset quota threshold), the available resource request quota is used. If there is no available resource request quota, a resource request quota of a density grade that is two grades higher than the current density grade is further obtained. If there is an available resource request quota, the available resource request quota is used. If there is no available resource request quota, it is further determined whether a next higher density grade has an available resource request quota.

Figure 6:
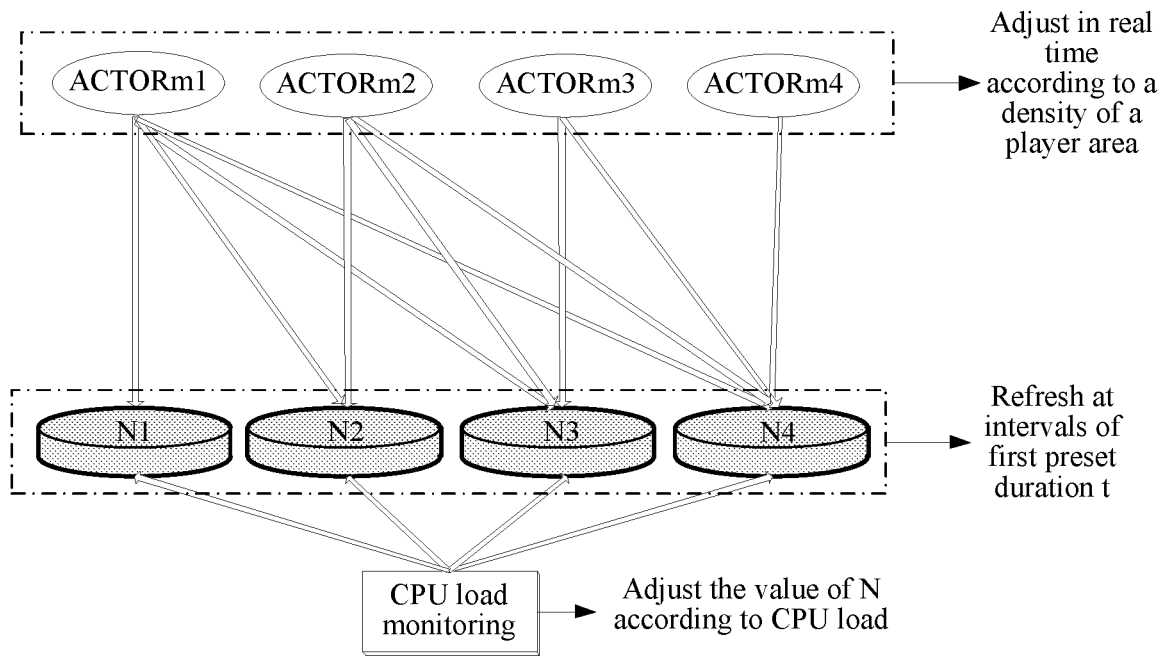
FIG. 6 is a schematic diagram of usage of a resource request quota according to an embodiment of this application.

As shown in FIG. 6, when m1<m2<m3<m4, ACTORm1 may use resource request quotas of ACTORm2, ACTORm3, and ACTORm4; ACTORm2 may use resource request quotas of ACTORm3 and ACTORm4; ACTORm3 may use resource request quota of ACTORm4.

For example, it is assumed that the preset quota threshold is equal to 0, the resource request is a spell request, and a preset value subtracted is 1 each time a spell request is processed. When N1 corresponding to ACTORm1 is greater than 0, upon reception of a spell request sent by a player in ACTORm1, the spell request is processed, and 1 is subtracted from N1, until N1 is equal to 0. In this case, when a spell request of a player in ACTORm1 is further received, it is determined whether N2 corresponding to ACTORm2 is greater than 0. If N2 is greater than 0, the received spell request of the player in the ACTORm1 is processed. If N2 is less than 0, it is determined whether N3 corresponding to ACTORm3 is greater than 0. The processing is performed sequentially. When N2, N3, and N4 corresponding to ACTORm2, ACTORm3, and ACTORm4 are all equal to 0, the spell request is rejected.

In such a manner in which players in a low density grade can preempt a resource request quota of players in a high density grade, spell releasing of players highly sensitive to experience can be prioritized in the case of limited physical resources. Moreover, in this manner, the server can process more spell requests on average.

In addition, after the first preset duration t, a resource request quota is reallocated to each density grade. The first preset duration t can be adjusted according to a computing capability of the server and a spell frequency design of the game application program.

Optionally, the first preset duration t should be as short as possible without causing more extra performance overheads. In this way, a player with a high level of participation also has a relatively high keying frequency during a large-scale group combat. Correspondingly, in FIG. 3, a density of attack lines is relatively high. When the initial resource request quota is refreshed at a high frequency, a player with a high level of participation has a higher probability of obtaining a resource request feedback than a player with a low level of participation, thereby achieving an objective of allocating as many resources as possible to players with a high level of participation in the case of limited physical resources.

In the game application program, the game spell includes a combo spell. The combo spell refers to a behavior mode in which a virtual object continuously casts a plurality of spells in coordination in an action game, which can bring about a fast-paced delightful game experience.

If some virtual characters cannot obtain resource request feedbacks within second preset duration due to a probability problem, continuous spell casting may be interrupted.

Therefore, a timeout protection method is added in some embodiments of this application: when it is detected that all resource requests sent by a target virtual object within second preset duration have been rejected, upon reception of a next resource request sent by the target virtual object, processing the resource request sent by the target virtual object.

If the resource request is a spell request, when a spell request of a player is not cast within second preset duration T, a spell request cast quota is directly allocated to the player, so that the experience of the player is not affected.

When the load of the CPU is less than a preset load threshold, and the preset load threshold indicates that the CPU is far from being overloaded, for example, when the preset load threshold is 20% and the load of the CPU is less than 20%, the second preset duration T is set to be less than preset interval at which two continuous resource requests are allowed to be sent (e.g., from the game client) or allowed to be processed by the server. For example, the preset duration may be a cooldown time designated for casting a spell (e.g., 2 seconds), an effective duration designated for a buff/debuff effect (e.g., adding health point every 1.1 seconds), etc. The server may be configured to respond to at least one resource request from the player to feedback an effect of a player operation before the effective time of such operation runs out (e.g., 2 seconds or 1.1 seconds in the previously described two examples). In some embodiments, the server may identify the type of the resource request, determine the designated effective duration based on the type, and determine the preset interval based on the determined effective duration.

When the resource request is a spell request, the preset duration of an interval at which two continuous resource requests are allowed to be sent is an interval time for casting continuous spells commonly used in games, so that the player can cast a combo spell, thereby ensuring a continuous basic game experience.

When the load of the CPU is close to or reaches an overload line, the value of the second preset duration T can be greatly improved instantly, to prevent the occurrence of an avalanche effect, and an effort is made to enable the server to recover a low-load state in a short period time, thereby reducing a time in which the experience of a player is affected and avoiding the occurrence of long-time stalling.

It can be learned from the foregoing technical solution that:

In one aspect, in some embodiments of this application, based on player cluster density distributions and behavior features of players in different density distributions, in combination with computing power distribution characteristics of a CPU, a spell casting delay during a multi-player same-screen match can be smoothed, thereby improving overall spell throughput of the players.

In another aspect, in some embodiments of this application, according to behavior features of players during a group combat, players in a low density grade can preempt a spell request quota of players in a high density grade, so that spell casting of players highly sensitive to experience is prioritized adaptively, thereby greatly improving the overall game experience of a player group.

In another aspect, in some embodiments of this application, spell quotas can be allocated dynamically at a high frequency by improving a refreshing frequency of the first preset duration t, so that experience of players with a high level of participation can be prioritized adaptively. Players with a high keying frequency and a high level of participation are more likely to preempt a spell request quota, thereby prioritizing the experience of the players with a high level of participation.

In addition, in some embodiments of this application, a spell request quota can be directly allocated to a player who fails to a spell request quota in a relatively long time, so that the basic game experience of the player can be ensured.

The method for processing a resource request in an embodiment of this application is described above. The following describes an apparatus for processing a resource request in an embodiment of this application from the perspective of functional modules.

The apparatus for processing a resource request in some embodiments of this application specifically implements the functions in the method embodiment described in FIG. 2 to FIG. 6. The functions may be implemented by hardware, or implemented by hardware executing a corresponding software program. The hardware and software include one or more unit modules corresponding to the foregoing functions. The unit module may be software and/or hardware. Optionally, the apparatus for processing a resource request in some embodiments of this application includes one or more processors, and one or more memories for storing program units. The program units are executed by the processor, and the program units may include a density grade division unit, a quota allocation unit, a resource request receiving unit, and a resource request processing unit.

Figure 7:
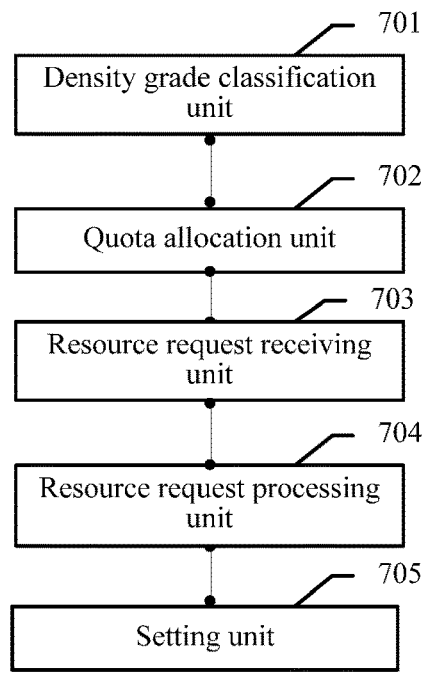
FIG. 7 is a schematic structural diagram of functional modules in an apparatus for processing a resource request according to an embodiment of this application.

As shown in FIG. 7, the apparatus for processing a resource request in some embodiments of this application includes:

a density grade division unit 701, configured to classify access virtual objects into a plurality of density grades according to a density of interaction virtual objects in a current visual range of each virtual object, a level of the density grade being positively correlated to a value of the density of virtual objects;

a quota allocation unit 702, configured to allocate a resource request quota to each density grade, the resource request quota corresponding to each density grade being a quantity of resource requests that are sent by virtual objects in the density grade and that are allowed to be processed within first preset duration;

a resource request receiving unit 703, configured to receive resource requests sent by virtual objects in a first density grade; and a resource request processing unit 704, configured to determine whether a resource request quota corresponding to the first density grade is greater than a preset quota threshold when the receiving unit receives, within the first preset duration, a resource request sent by a virtual object in the first density grade; process the resource request if the resource request quota corresponding to the first density grade is greater than the preset quota threshold, and subtract a preset value from the resource request quota corresponding to the first density grade; and reject the resource request if it is determined that the resource request quota corresponding to the first density grade is less than or equal to the preset quota threshold.

Optionally, the resource request processing unit 704 may be further configured to process, if it is determined that the resource request quota corresponding to the first density grade is greater than the preset quota threshold, a resource request when the receiving unit receives, within the first preset duration, the resource request sent by a virtual object in the first density grade, and subtract a preset value from the resource request quota corresponding to the first density grade; and reject the resource request if it is determined that the resource request quota corresponding to the first density grade is less than or equal to the preset quota threshold.

In some specific embodiments, the resource request processing unit 704 is further configured to determine whether resource request quotas corresponding to other density grades higher than the first density grade are all less than the preset quota threshold when the resource request quota corresponding to the first density grade is less than or equal to the preset quota threshold, and reject the resource request if the resource request quotas corresponding to other density grades are all less than the preset quota threshold.

Optionally, the request processing unit 704 is further configured to reject the resource request when the resource request quota corresponding to the first density grade is less than or equal to the preset quota threshold and it is determined that resource request quotas corresponding to other density grades higher than the first density grade are all less than the preset quota threshold.

In some specific embodiments, the resource request processing unit 704 is further configured to process the resource request when a resource request quota corresponding to a second density grade higher than the first density grade is greater than the preset quota threshold, and subtract the preset value from the resource request quota corresponding to the second density grade.

In some specific embodiments, the quota allocation unit 702 is specifically configured to allocate a resource request quota to each density grade according to current load of a CPU, a value of the resource request quota being negatively correlated to a value of the current load of the CPU.

In some specific embodiments, the quota allocation unit 702 is further configured to reallocate a resource request quota to each density grade after the first preset duration.

In some specific embodiments, the resource request processing unit 704 is further configured to process, when it is detected that all resource requests sent by a target virtual object within second preset duration have been rejected and a next resource request sent by the target virtual object is received, the next resource request sent by the target virtual object.

In some specific embodiments, the apparatus for processing a resource request further includes a setting unit 705, configured to set the second preset duration to be less than preset duration of an interval at which two continuous resource requests are allowed to be sent, when the load of the CPU is less than a preset load threshold.

In some specific embodiments, the density grade division unit 701 is specifically configured to obtain the density of interaction virtual objects in the current visual range of each virtual object; and classify virtual objects, whose densities belong to the same numerical range, into the same density grade.

For information interaction between functional units shown in FIG. 7, refer to the method embodiment described in FIG. 2 to FIG. 6. For the problem solving implementation and beneficial effects of the apparatus for processing a resource request, reference may be made to the method embodiment and beneficial effects described in FIG. 2 to FIG. 6; therefore, details are not described herein again.

In practical application, functions of the apparatus for processing a resource request shown in FIG. 7 may be executed by a processor in a server.

Figure 8:
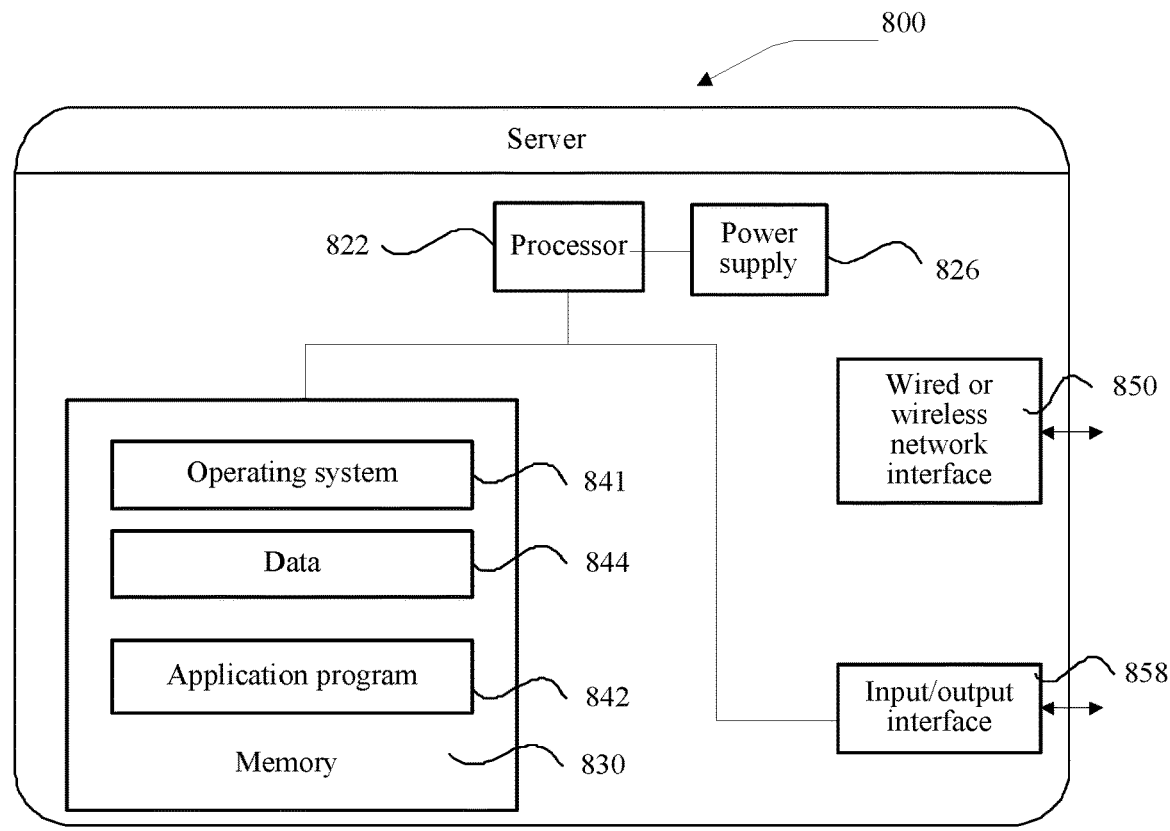
FIG. 8 is a schematic diagram of a hardware structure of a server according to an embodiment of this application.

FIG. 8 is a schematic structural diagram of a server according to an embodiment of this application. The server 800 may vary significantly due to different configurations or performance, and may include one or more CPUs 822 (for example, one or more processors) and a memory 830. The memory 830 stores one or more application programs 842, data 844, and one or more operating systems 841. The program stored in the memory 830 may include one or more modules (not marked in the figure), and each module may include a series of instruction operations on the server. Optionally, the memory 830 stores a game application program.

The CPU 822 communicates with the memory 830, and performs, on the server 800, a series of instruction operations in the memory 830. Optionally, the CPU 822 invokes the game application program stored in the memory 830 to implement the solution described in FIG. 2 to FIG. 6.

The operating system 841 may be, for example, Windows Server™, Mac OS X™, Unix™, Linux™, and FreeBSD™.

The server 800 may further include one or more power supplies 826, one or more wired or wireless network interfaces 850, and one or more input/output interfaces 858.

Figure 9:
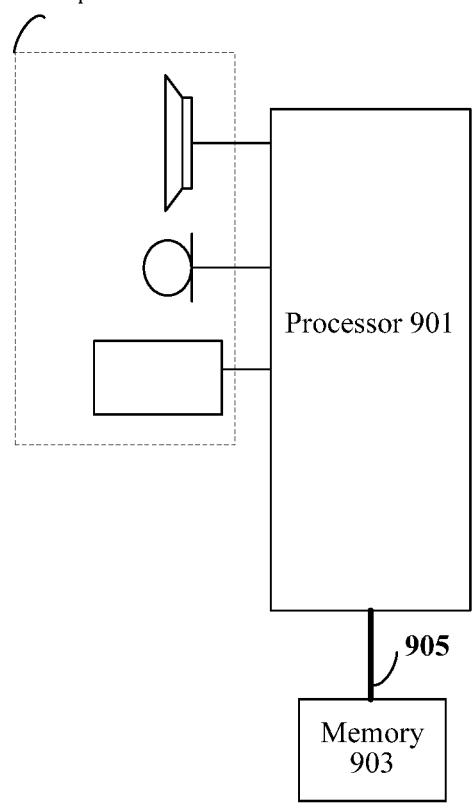
FIG. 9 is a schematic diagram of a hardware structure of an electronic apparatus according to an embodiment of this application.

According to another aspect of the embodiments of this application, an electronic apparatus for implementing the method for processing a resource request is further provided. As shown in FIG. 9, the electronic apparatus may include one or more processors 901 (only one processor is shown in FIG. 9), a memory 903, and a transmission apparatus 905. As shown in FIG. 9, the electronic apparatus may further include an input/output device 907.

The memory 903 may be configured to store a computer program and modules, for example, program instructions/modules corresponding to the method and apparatus for processing a resource request in the embodiments of this application. The processor 901 is configured to run the software program and modules stored in the memory 903, so as to perform various functional applications and data processing, that is, implement the foregoing data loading method. The memory 903 may include a high speed random access memory, and may also include a non-volatile memory, such as one or more magnetic disk storage apparatuses, a flash memory, or another non-volatile solid-state memory. In some instances, the memory 903 may further include memories remotely disposed with respect to the processor 901. The remote memories may be connected to a terminal through a network. Examples of the network include, but are not limited to, the Internet, an intranet, a local area network, a mobile communications network, and a combination thereof.

The transmission apparatus 905 is configured to receive or send data through a network, and may be further configured to transmit data between the processor and the memory. Specific examples of the network may include a wired network and a wireless network. In an example, the transmission apparatus 905 includes a network interface controller (NIC), and may be connected to another network device through a cable, thereby communicating with the Internet or a local area network. In an example, the transmission apparatus 905 is a radio frequency (RF) module, and is configured to communicate with the Internet in a wireless manner.

Optionally, the memory 903 is configured to store an application program.

The processor 901 may invoke, through the transmission apparatus 905, the application program stored in the memory 903, so as to perform the following steps: classifying access virtual objects into a plurality of density grades according to a density of interaction virtual objects in a current visual range of each virtual object, a level of the density grade being positively correlated to a value of the density of virtual objects; allocating a resource request quota to each density grade, the resource request quota corresponding to each density grade being a quantity of resource requests that are sent by virtual objects in the density grade and that are allowed to be processed within first preset duration; when a resource request sent by a virtual object in a first density grade is received within the first preset duration and when it is determined that a resource request quota corresponding to the first density grade is greater than a preset quota threshold, processing the resource request and subtracting a preset value from the resource request quota corresponding to the first density grade; and rejecting the resource request if it is determined that the resource request quota corresponding to the first density grade is less than or equal to the preset quota threshold.

The processor 901 is further configured to perform the following step: rejecting the resource request if the resource request quota corresponding to the first density grade is less than or equal to the preset quota threshold and it is determined that resource request quotas corresponding to other density grades higher than the first density grade are all less than the preset quota threshold.

The processor 901 is further configured to perform the following step: processing the resource request if a resource request quota corresponding to a second density grade higher than the first density grade is greater than the preset quota threshold, and subtracting the preset value from the resource request quota corresponding to the second density grade.

The processor 901 is further configured to perform the following step: allocating a resource request quota to each density grade according to current load of a CPU, a value of the resource request quota being negatively correlated to a value of the current load of the CPU.

The processor 901 is further configured to perform the following step: reallocating a resource request quota to each density grade after the first preset duration.

The processor 901 is further configured to perform the following step: when it is detected that all resource requests sent by a target virtual object within second preset duration have been rejected, processing a next resource request sent by the target virtual object upon reception of the next resource request sent by the target virtual object.

The processor 901 is further configured to perform the following step: setting the second preset duration to be less than preset duration of an interval at which two continuous resource requests are allowed to be sent, when the load of the CPU is less than a preset load threshold.

The processor 901 is further configured to perform the following step: obtaining the density of interaction virtual objects in the current visual range of each virtual object; and classifying virtual objects, whose densities belong to the same numerical range, into the same density grade.

A person of ordinary skill in the art may understand that, the structure shown in FIG. 9 is merely an example, and the electronic apparatus may be a smart phone (such as an Android phone or an iOS phone), a tablet computer, a palmtop computer, a mobile Internet device (Mobile Internet Device), a PAD, and other terminal devices. FIG. 9 does not limit the structure of the electronic apparatus. For example, the electronic apparatus may further include more or fewer components (such as a network interface and a display apparatus) than those shown in FIG. 9, or may have a configuration different from that shown in FIG. 9.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiment is merely exemplary. For example, the unit division is merely a logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objective of the solution of some embodiments.

In addition, functional units in the embodiments of this application may be integrated into one processing unit, or each of the units may exist alone physically, or two or more units may be integrated into one unit. The integrated units may be implemented in a hardware form, or in a form of a software functional unit.

When implemented in the form of a software functional unit and sold or used as an independent product, the integrated units may be stored in a computer-readable storage medium. Based on such an understanding, the technical solutions of this application essentially, or the part contributing to the prior art, or some or all of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: various media that can store program code, such as a USB flash drive, a removable hard disk, a read-only memory (ROM), a random access memory (RAM), a magnetic disk, or an optical disc.

The foregoing embodiments are merely used for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof; such modifications or replacements do not cause the essence of the corresponding technical solutions to depart from the spirit and scope of the technical solutions of the embodiments of this application.

INDUSTRIAL APPLICABILITY

In the embodiments of this application, access virtual objects are classified into a plurality of density grades according to a density of interaction virtual objects in a current visual range of each virtual object; a resource request quota is allocated to each density grade; when a resource request sent by a virtual object in a density grade is received within preset duration, the received resource request is processed if it is determined that a resource request quota corresponding to the density grade is greater than a preset quota threshold, and a preset value is subtracted from the resource request quota corresponding to the density grade; and the resource request is rejected if it is determined that the resource request quota corresponding to the density grade is less than or equal to the preset quota threshold. In the embodiments of this application, virtual objects can be classified into density grades, and a resource request quota is allocated to each density grade; when the resource request quota is less than or equal to a preset quota threshold, a CPU rejects processing resource requests sent by virtual objects in the density grade, so that processing of the CPU is not overloaded, thereby alleviating a stalling problem caused by an insufficient computing capability of a server.

What is claimed is:

1. A method for allocating resources to virtual objects, the method comprising:
classifying, by a computing device, one or more first access virtual objects into a first density grade and one or more second access virtual objects into a second density grade, the first density grade representing a first number of one or more interaction virtual objects in a first interactive range of each of the one or more first access virtual objects, the second density grade representing a second number of one or more interaction virtual objects in a second interactive range of each of the one or more second access virtual objects, the first density grade being lower than the second density grade;

determining, by the computing device, a collective resource request quota according to a load of a CPU (central processing unit) of the computing device, wherein the collective resource request quota is inversely related to the load of the CPU of the computing device in that the collective resource request quota decreases as the load of the CPU of the computing device increases, and wherein the collective resource request quota includes a first resource request quota and a second resource request quota respectively representing a first and a second quantity of resource requests respectively allocated to the first and second access virtual objects within a first preset duration;

allocating, by the computing device, the first resource request quota to the first density grade and the second resource request quota to the second density grade;

in response to determining that a resource request sent by the one or more first access virtual objects from the first density grade is received by the computing device within the first preset duration and that the first resource request quota is greater than a first preset quota threshold, processing, by the computing device, the resource request and subtracting a preset value from the first resource request quota;

rejecting, by the computing device, the resource request in response to determining that the first resource request quota is less than or equal to the first preset quota threshold and that the second resource request quota is less than or equal to the second preset quota threshold;

after the first preset duration ends, allocating, by the computing device, an updated request quota for a second preset duration according to an updated load of the CPU of the computing device;

smoothing a spell casting delay during a multi virtual object same-screen match based on computing power distribution characteristics of the computing device and the first and second density grades; and preempting the second resource request quota of the one or more second access virtual objects in the second density grade by the one or more first access virtual objects in the first density grade.

2. The method according to claim 1, further comprising:
in response to determining that the first resource request quota is less than or equal to the first preset quota threshold and that the second resource request quota is greater than the second preset quota threshold, processing, by the computing device, the resource request and subtracting the preset value from the second resource request quota.

3. The method according to claim 1, further comprising:
in response to determining that all resource requests sent by the one or more first access virtual objects within a second preset duration have been rejected and a next resource request sent by the one or more first access virtual objects is received, processing, by the computing device, the next resource request sent by the one or more first access virtual objects.

4. The method according to claim 3, further comprising:
setting, by the computing device, the second preset duration to be less than a preset interval at which two resource requests are allowed to be sent, in response to determining a current load of the CPU of the computing device is less than a preset load threshold.

5. The method according to claim 1, further comprising:
setting, by the computing device, the second resource request quota to be smaller than the first resource request quota.

6. The method according to claim 1, wherein the collective resource request quota includes a third resource request quota, the method further comprising:
allocating, by the computing device, the third resource request quota to a third density grade, wherein the second density grade is lower than the third density grade;
in response to determining that the first resource request quota is less than or equal to the first preset quota threshold, that the second resource request quota is greater than the second preset quota threshold, and that the third resource request quota is greater than a third preset quota threshold, processing, by the computing device, the resource request and subtracting the preset value from the second resource request quota prior to subtracting the preset value from the third resource request quota.

7. The method according to claim 1, wherein the first density grade is represented by a numerical range, and wherein the one or more first access virtual objects are of different densities but grouped into the numerical range.

8. An apparatus for allocating resources to virtual objects, the apparatus comprising:
one or more processors; and
one or more memories coupled to the one or more processors and storing computer-readable program instructions executable by the one or more processors to perform:
classifying one or more first access virtual objects into a first density grade and one or more second access virtual objects into a second density grade, the first density grade representing a first number of one or more interaction virtual objects in a first interactive range of each of the one or more first access virtual objects, the second density grade representing a second number of one or more interaction virtual objects in a second interactive range of each of the one or more second access virtual objects, the first density grade being lower than the second density grade;
determining a collective resource request quota according to a load of a CPU (central processing unit) of the computing device, wherein the collective resource request quota is inversely related to the load of the CPU of the computing device in that the collective resource request quota decreases as the load of the CPU of the computing device increases, and wherein the collective resource request quota includes a first resource request quota and a second resource request quota respectively representing a first and a second quantity of resource requests respectively allocated to the first and second access virtual objects within a first preset duration;
allocating the first resource request quota to the first density grade and the second resource request quota to the second density grade;
in response to determining that a resource request sent by the one or more first access virtual objects from the first density grade is received by the computing device within the first preset duration and that the first resource request quota is greater than a first preset quota threshold, processing the resource request and subtracting a preset value from the first resource request quota;

rejecting the resource request in response to determining that the first resource request quota is less than or equal to the first preset quota threshold and that the second resource request quota is less than or equal to the second preset quota threshold;

after the first preset duration ends, allocating, by the computing device, an updated request quota for a second preset duration according to an updated load of the CPU of the computing device;

smoothing a spell casting delay during a multi virtual object same-screen match based on computing power distribution characteristics of the computing device and the first and second density grades; and preempting the second resource request quota of the one or more second access virtual objects in the second density grade by the one or more first access virtual objects in the first density grade.

9. The apparatus according to claim 8, wherein the computer-readable program instructions are executable by the one or more processor to further perform:

in response to determining that the first resource request quota is less than or equal to the first preset quota threshold and that the second resource request quota is greater than the second preset quota threshold, processing the resource request and subtracting the preset value from the second resource request quota.

10. The apparatus according to claim 8, wherein the computer-readable program instructions are executable by the one or more processor to further perform:

in response to determining that all resource requests sent by the one or more first access virtual objects within a second preset duration have been rejected and a next resource request sent by the one or more first access virtual objects is received, processing the next resource request sent by the one or more first access virtual objects.

11. The apparatus according to claim 10, wherein the computer-readable program instructions are executable by the one or more processor to further perform:

setting the second preset duration to be less than a preset interval at which two resource requests are allowed to be sent, when in response to determining a current load of the CPU is less than a preset load threshold.

12. A non-transitory computer-readable storage medium storing computer program instructions executable by at least one processor to perform:

classifying one or more first access virtual objects into a first density grade and one or more second access virtual objects into a second density grade, the first density grade representing a first number of one or more interaction virtual objects in a first interactive range of each of the one or more first access virtual objects, the second density grade representing a second number of one or more interaction virtual objects in a second interactive range of each of the one or more second access virtual objects, the first density grade being lower than the second density grade;

determining a collective resource request quota according to a load of a CPU (central processing unit) of the computing device, wherein the collective resource request quota is inversely related to the load of the CPU of the computing device in that the collective resource request quota decreases as the load of the CPU of the computing device increases, and wherein the collective resource request quota includes a first resource request quota and a second resource request quota respectively representing a first and a second quantity of resource requests respectively allocated to the first and second access virtual objects within a first preset duration;

allocating the first resource request quota to the first density grade and the second resource request quota to the second density grade;

in response to determining that a resource request sent by the one or more first access virtual objects from the first density grade is received by the computing device within the first preset duration and that the first resource request quota is greater than a first preset quota threshold, processing the resource request and subtracting a preset value from the first resource request quota;

rejecting the resource request in response to determining that the first resource request quota is less than or equal to the first preset quota threshold and that the second resource request quota is less than or equal to the second preset quota threshold;

after the first preset duration ends, allocating, by the computing device, an updated request quota for a second preset duration according to an updated load of the CPU of the computing device;

smoothing a spell casting delay during a multi virtual object same-screen match based on computing power distribution characteristics of the computing device and the first and second density grades; and preempting the second resource request quota of the one or more second access virtual objects in the second density grade by the one or more first access virtual objects in the first density grade.

13. The storage medium according to claim 12, wherein the computer program instructions further cause the at least one processor to perform:

in response to determining that the first resource request quota is less than or equal to the first preset quota threshold and that the second resource request quota is greater than the second preset quota threshold, processing the resource request and subtracting the preset value from the second resource request quota.

* * * * *